Aug. 21, 1923.

E. BROOKES 1,465,577

MACHINE FOR USE IN THE MANUFACTURE OF TEACUPS, BREAKFAST CUPS, BEAKERS, AND OTHER VESSELS OR ARTICLES OF POTTERY

Filed Aug. 12, 1922

7 Sheets-Sheet 6

Inventor,
Elijah Brookes
by Herbert W. Jenner
Attorney.

Aug. 21, 1923.

E. BROOKES 1,465,577

MACHINE FOR USE IN THE MANUFACTURE OF TEACUPS, BREAKFAST CUPS, BEAKERS, AND OTHER VESSELS OR ARTICLES OF POTTERY

Filed Aug. 12, 1922    7 Sheets-Sheet 7

Inventor
Elijah Brookes
by Herbert W. Jenner
Attorney

Patented Aug. 21, 1923.

1,465,577

UNITED STATES PATENT OFFICE.

ELIJAH BROOKES, OF STOKE-ON-TRENT, ENGLAND.

MACHINE FOR USE IN THE MANUFACTURE OF TEACUPS, BREAKFAST CUPS, BEAKERS, AND OTHER VESSELS OR ARTICLES OF POTTERY.

Application filed August 12, 1922. Serial No. 581,436.

*To all whom it may concern:*

Be it known that I, ELIJAH BROOKES, subject of the King of Great Britain and Ireland, and resident of Old House Green, Scholar Green, Stoke-on-Trent, in the county of Stafford, England, earthenware manufacturer, have invented a certain new and useful Machine for Use in the Manufacture of Teacups, Breakfast Cups, Beakers, and Other Vessels or Articles of Pottery (for which I have filed application in Great Britain by application for Patent No. 182,707, dated the 29th day of July, 1921), of which the following is a specification.

My invention relates to a new or improved machine for use in the manufacture of teacups, breakfast cups, beakers, and other vessels or articles of pottery, the object being to provide a machine to expeditiously and efficiently finish the clay articles after they have been shaped or cast.

My invention will be fully described with reference to the accompanying drawings, in which—

Figure 1:
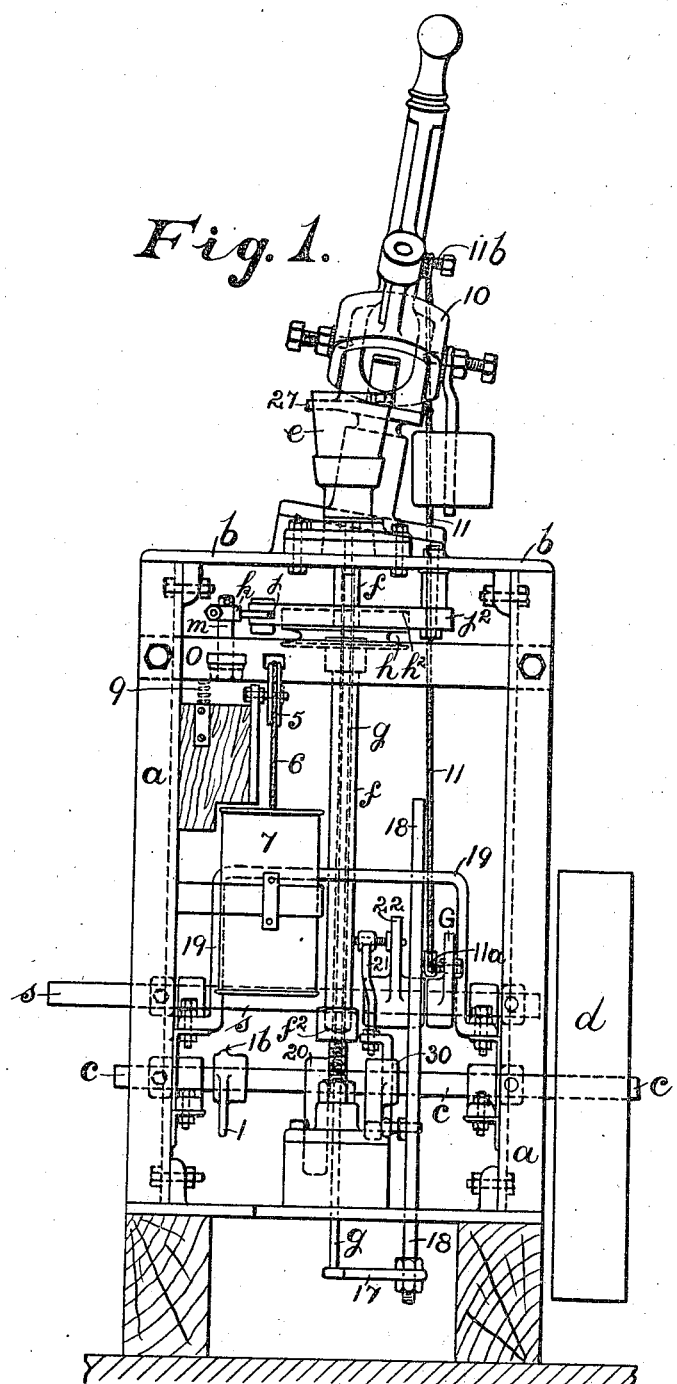
Figure 2:
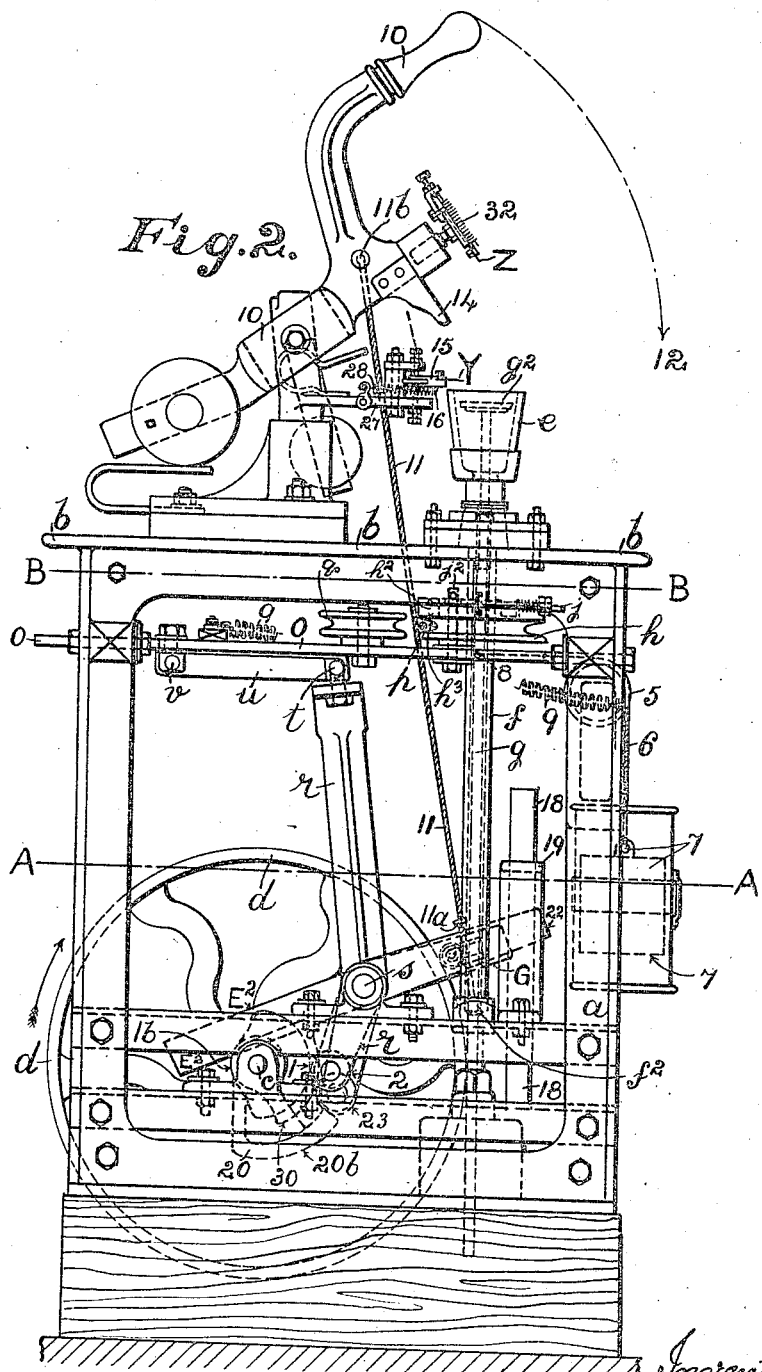
Figure 3:
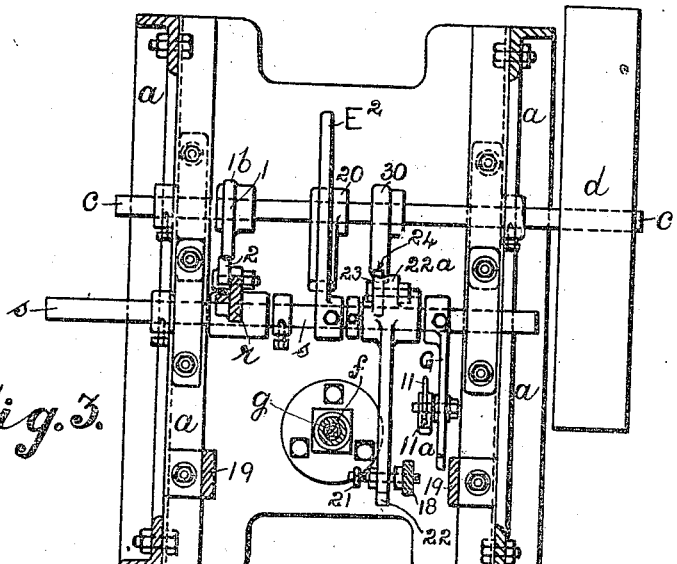
Figure 4:
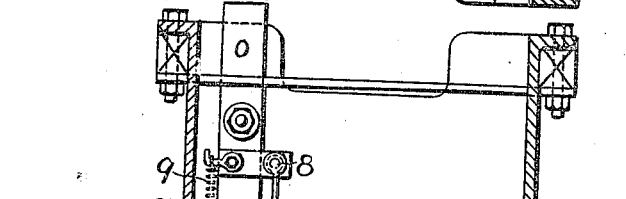
Figure 5:
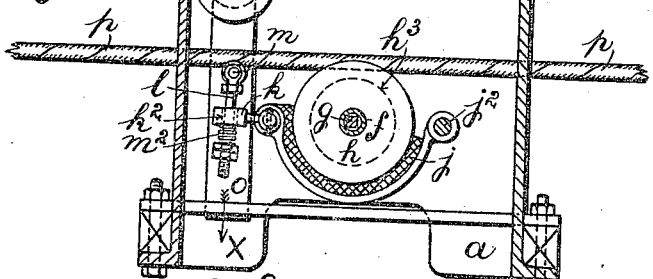
Figure 6:
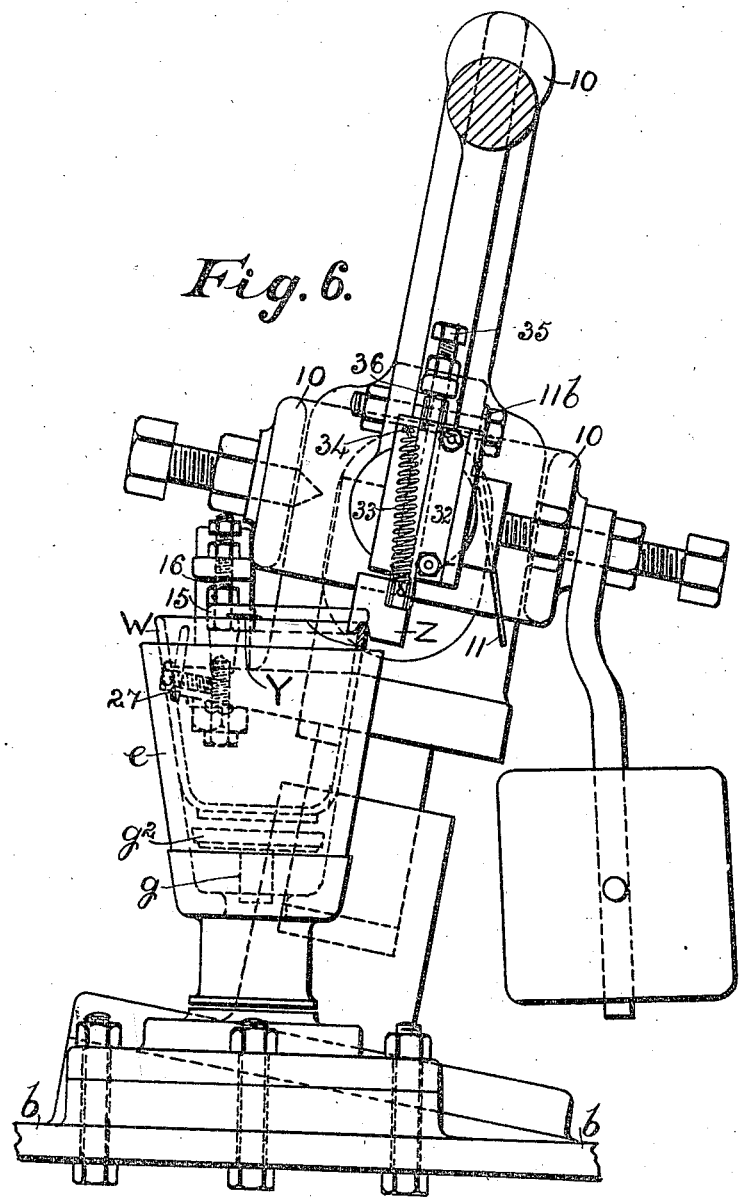
Figure 7:
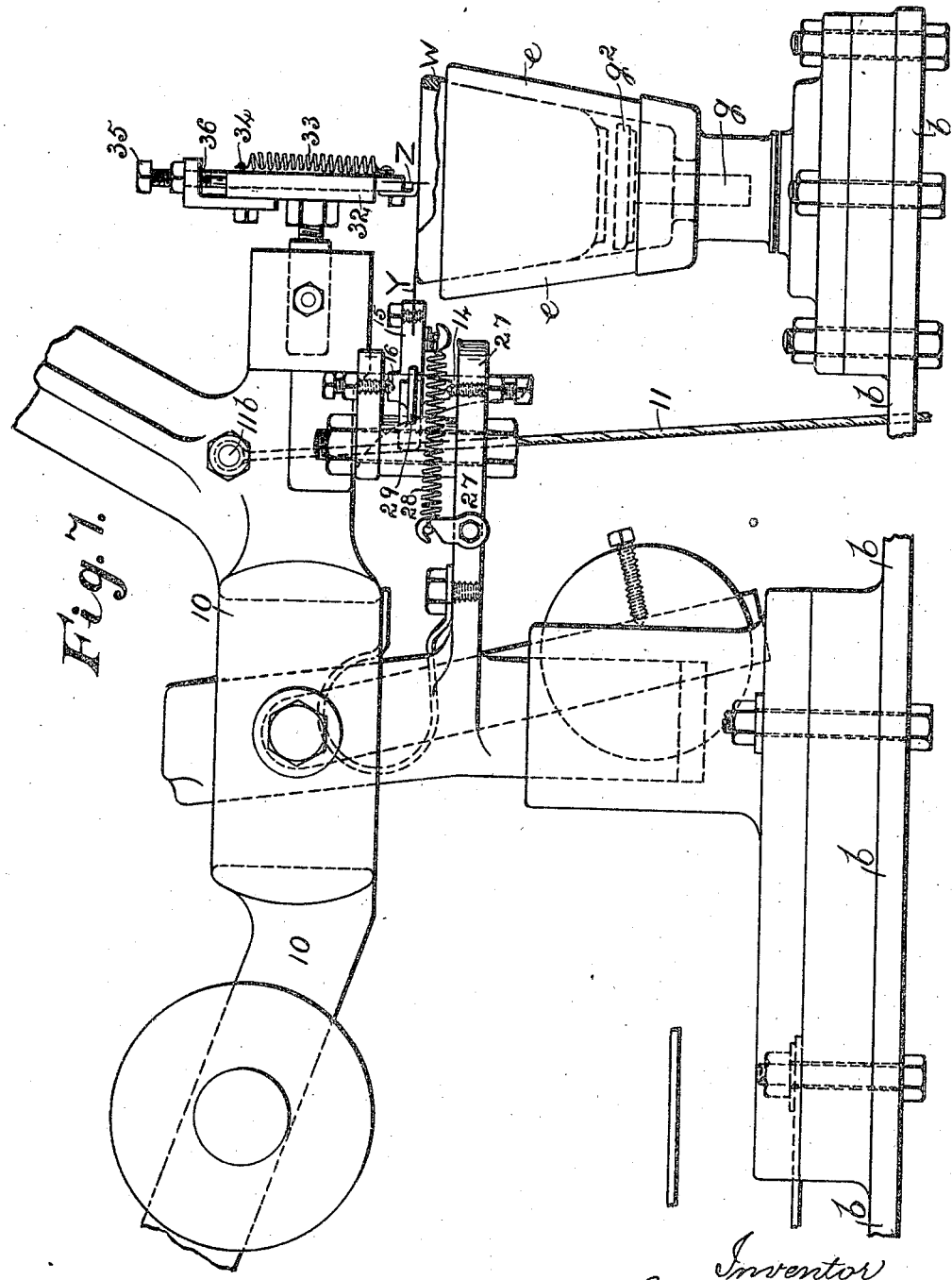
Figure 8:
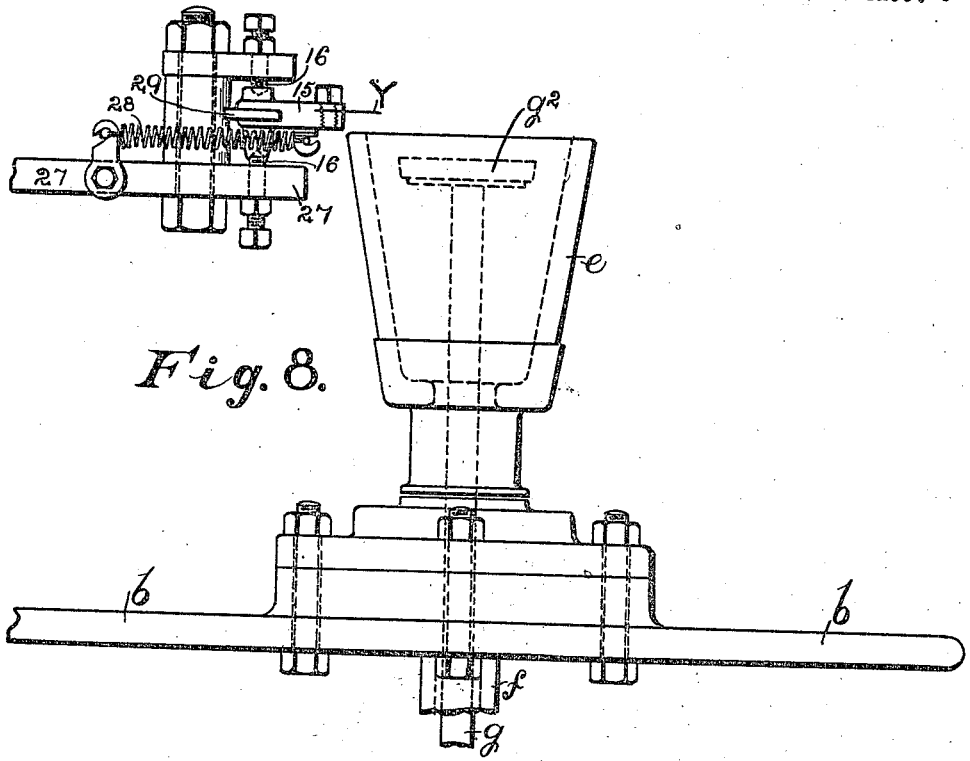
Figure 9:
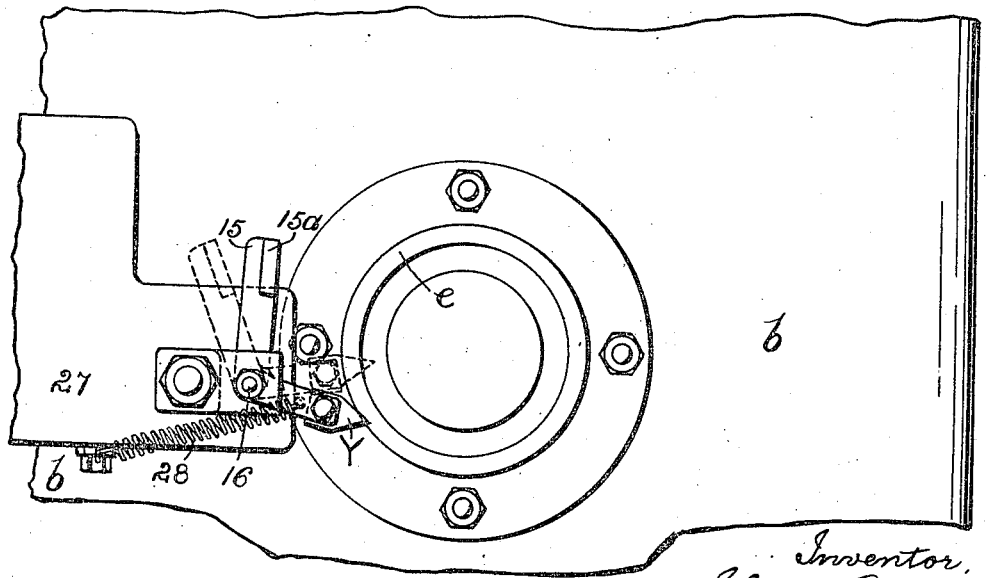
Figure 14:
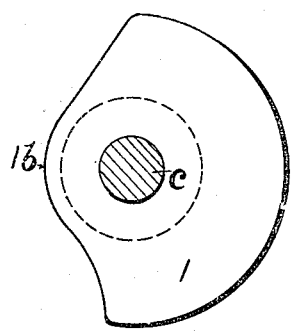
Figure 15:
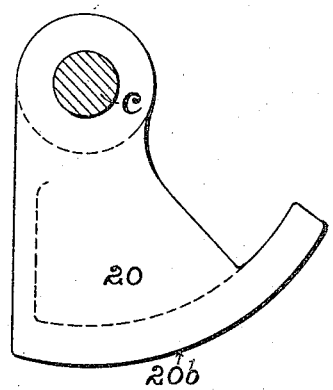
Figure 16:
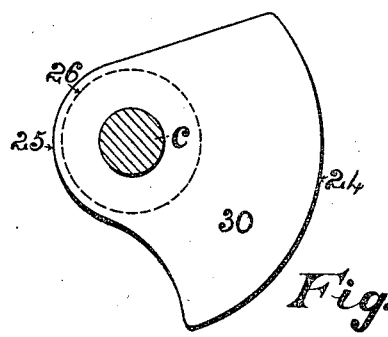

Fig. 1 is a part front elevation of the machine constructed according to my said invention, certain of the details not being shown, Fig. 2 is a side elevation thereof, Fig. 3 is a sectional plan through line A—A of Fig. 2, Fig. 4 is a sectional plan through line B—B of Fig. 2, illustrating the means for arresting the rotatable chuck which carries the clay article, Fig. 5 is a part sectional plan, or a portion of that illustrated at Fig. 4, showing the parts in a different position to be hereinafter referred to, Fig. 6 is a front elevation of the upper part of the machine drawn to an enlarged scale, the parts being in the position they assume when the clay article W in the chuck is being operated upon, Fig. 7 is a side elevation of Fig. 6, Fig. 8 is an elevation of the rotatable chuck and cutting device for severing the upper edge of the clay article. The clay article is removed from the rotatable chuck so as to clearly show the operation of the cutter or knife, Fig. 9 is a plan of Fig. 8, Figs. 10 to 13 are sectional elevations of the rotatable chuck with the clay cup body W in different positions, and Figs. 14 to 16 are enlarged views of the cams.

Figure 10:
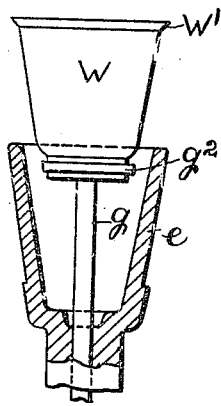

Various hollow vessels or clay articles can be cut off, grooved, edged and rounded by my improved machine but I will describe the machine for edging and rounding cup bodies W. The cup body W is cast from clay slip in a plaster mould in the ordinary way but instead of casting it the correct height of a cup it is cast a little higher and with an outwardly splayed flange or upper edge $W^1$ as shown at Fig. 10.

In the figures $a$ is the machine frame, $b$ the table and $c$ the main shaft driven by a belt pulley $d$.

Figure 11:
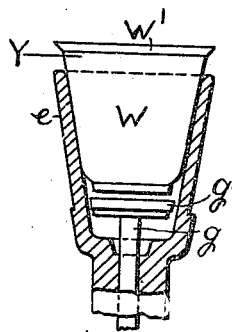
Figure 12:
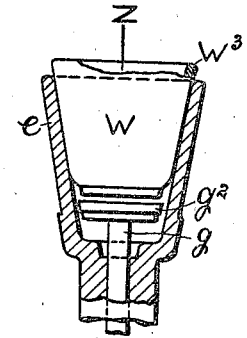
Figure 13:
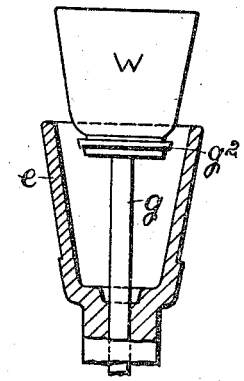

A rotatable chuck $e$ is employed to accommodate the clay body or cup W, (see Figs. 10 to 13). These figures show the cast clay article W in its initial position; then lowered into contact with rotatable chuck and the knife severing the upper outwardly splayed edge; the upper edge of the clay article then being rounded by the tool; and the finished clay article W raised out of contact with the chuck so as to be readily removed. The chuck is secured at the end of a sleeve $f$ the lower end working in an adjustable footstep bearing $f^2$ carried on the machine frame. Extending through the said sleeve $f$ is a slidable rod $g$ carrying a disc $g^2$ at its upper end, the latter being arranged to move vertically inside the chuck $e$. The clay cup body W is placed on the disc $g^2$ (Fig. 10), the disc is then automatically moved downwards to allow the outside of the clay cup W to make contact with the interior of the chuck $e$ as shown at Fig. 11 in which position the chuck and clay cup revolve together, the knife or cutter Y (Fig. 11) then severing the splayed top of the clay body. Immediately this severance has taken place a rounding tool Z is brought into use to round the top edge $W^3$ (Fig. 12). The chuck $e$ is prevented from rotating whilst the disc $g^2$ and the finished article W thereon is raised in a position to be readily taken off as shown at Fig. 13.

The sleeve $f$ has a rope pulley $h$ connected thereto the upper flange $h^2$ of said pulley being of such a width to enable a brake $j$ to make contact therewith when necessary. The brake $j$ is hinged at $j^2$ to the table $b$ as shown at Fig. 1, the opposite end to the hinge being connected by a short arm $k$ to an adjustable bolt $l$ hinged at $m$ to a slide $o$, the said bolt $l$ (Fig. 4) being provided with a cushion spring $m^2$ and freely moving in a hole $k^2$ in the short arm $k$. When the slide $o$ is moved forward in the direction of the arrow X (see plan Fig. 4) the brake $j$ is thrown out of contact with the pulley $h$ and the travelling driving rope $p$ is taken into contact with the pulley $h$ by the small grooved pulley $q$ on the slide $o$ as shown at Fig. 5 to rotate the chuck $e$ and clay cup W therein. The reverse or backward travel of the slide $o$ takes the brake $j$ into contact with the pulley $h$ and allows the travelling driving rope $p$ to clear the grooved periphery $h^3$ of the pulley $h$ as shown at Figs. 2 and 4. The said slide $o$ receives its motion from a two-armed lever $r$ secured to a rocking shaft $s$ and having its upper end pivotally connected at $t$ to a link $u$ which is also pivotally connected at $v$ to the slide $o$. The lower short arm of the lever $r$ is provided with a bowl 2 which is always in contact with the cam 1, the latter being shaped to give the necessary reciprocating movement to the slide to take the travelling rope drive in and out of action. The forward motion of the slide $o$ is assisted by a cable 6 passing over a guide pulley 5 having a weight 7 at its lower end and connected at 8 to the slide, the weight tending to keep the bowl 2 on the lower end of the arm $r$ always in contact with the face of the cam 1. If desired a spring 9 connected to the slide $o$ and to the front of the frame $a$ may be employed to draw the slide $o$ forward. The said spring 9 is broken off to clearly show the other mechanism. During the continued rotation of the shaft $c$ the cam 1 secured thereon forces the slide inwards as shown at Fig. 2 the weight 7 drawing it forward when that portion of the cam face $1^b$ nearest the driving shaft $c$ reaches the bowl 2, the continually moving rope $p$ then rotating the chuck $e$ whilst the top edge of the clay cup is being severed and also rounded in a manner to be herein described.

Figs. 1 and 2 illustrate the machine in its initial position that is, the weighted arm 10 raised ready for the chuck $e$ to receive a clay cup body W, whilst Figs. 6 and 7 show the weighted arm 10 in its horizontal position when cutting off and rounding the upper edge of the clay cup W.

All the cams illustrated on the drawings are in the position they assume when the hinged weighted arm 10 is raised. As before stated cam 1 fixed on the shaft $c$ is for operating the slide $o$ through the two-armed lever $r$. Cam 20 secured to the shaft $c$ is for the purpose of operating the lever $E^2$, the part $20^b$ of the cam 20 lifting the lever to its full extent, this action causing the rocking shaft $s$ to sufficiently rotate and lower the lever G, fixed to the shaft $s$. The said lever G being connected at $11^a$ through the cable 11 and at $11^b$ to the hinged weighted arm 10 pulls the latter down in the direction of the arrow 12, the projection 14 thereon meets the inclined edge $15^a$ of a spring-controlled bell-crank lever 15 causing it to move on its fulcrum 16 into the dotted position shown at Fig. 9. A horizontal knife Y on the said bell-crank lever 15 gradually penetrates through the clay body W just below the upper splayed edge $W^1$ (Fig. 11). The bell-crank lever 15 being fulcrumed at 16 to the fixed bracket 27 is moved by the projection 14 on the weighted arm 10 to sever the clay, the spring 28 pulling the bell-crank lever back again to normal position shown in full lines (Fig. 9) immediately the projection 14 leaves it. A stop 29 on the bell-crank lever 15 limits its outward stroke.

When the weighted arm 10 descends and the knife Y has cut off the top of the clay body the rounding tool Z comes in operation finishing off the cut edge as shown at Figs. 6, 7 and 12.

The chuck $e$ with the clay body W commences to revolve as the knife Y approaches the clay, the revolution of the chuck $e$ being accomplished immediately the bowl 2 on lever $r$ takes against the face of cam 1 (Fig. 14) which allows the lever $r$ to move the slide outward, the grooved pulley $q$ thereon then taking the travelling rope $p$ against the grooved pulley $h$ which being fastened on the sleeve $f$ rotates the chuck $e$ just after the brake $j$ has been disengaged as shown at Fig. 5. The said chuck $e$ rotates sufficiently so that the top $W^1$ of the clay cup body W is cut off and the top edge $W^1$ is rounded by the tool Z. To facilitate the setting or adjustment of the rounding tool Z it is carried in a slide in a V shaped groove in a plate 32, the latter being adjustably connected to the weighted arm 10. A spring 33 is connected at 34 to the plate 32 and to the lower end of the slide carrying the tool Z. To lower the rounding tool Z a set screw 35 is rotated, the end 36 thereof pressing the slide down. When the set screw 35 is slackened the spring raises the slide.

Cam 20 allows the lever $E^2$ to move downwards to the position shown at Fig. 2, the weighted hinged arm 10 being then free to move to its initial position at Fig. 1. When the lever $E^2$ is moving downwards as stated the lever $r$ moves the slide $o$ inwards by which means the grooved pulley $q$ clears the travelling rope $p$ (Fig. 4), the brake $j$ makes contact with pulley $h$ and instantly prevents rotation of the chuck $e$ with the cut and finished clay body W therein.

The finished clay body W is raised out of the chuck $e$ to the position Fig. 13, immediately the chuck ceases to rotate. This is accomplished by the vertical square rod $g$, provided with the disc $g^2$ at its upper end, the lower end of the square rod $g$ being supported by a plate 17 secured to a vertical slide 18 guided by a fixed bracket 19. The said slide 18 is connected by a link 21 (Fig. 3) to a lever 22 loosely mounted on the shaft $s$, the said loose lever having a short arm $22^a$ carrying a bowl 23 which makes contact with cam 30 fixed on the shaft $c$. When the bowl 23 is against face 24 of the cam 30 the disc $g^2$ in the chuck $e$ remains at its highest position but as the bowl 23 moves along face 25 of the cam 30 the disc in the chuck moves down being at its lowest position when bowl 23 is nearest boss 26 of the cam 30. As shown at Figs. 11 and 12 the disc $g^2$ is clear of the clay body W when the latter is in contact with the chuck $e$.

The machine is operated as follows:— When the weighted hinged arm is in the position illustrated at Fig. 2 the disc $g^2$ is in its highest position, a cast clay body W is placed on the disc as shown at Fig. 10 which is then stationary, the driving rope being clear of the pulley $h$. The weighted arm 10 is then pulled down by means of the cable 11, the clay body making contact with the chuck, the slide $o$ moves forward, the rope $p$ is forced in contact with pulley $h$ which revolves the chuck allowing the knife Y to sever the top of the clay article and the tool Z to round it. Immediately the article is shaped the weighted arm 10 ascends and at the same time the disc is raised to position Fig. 13 enabling the finished article to be readily removed. Another clay body W is placed in position and the arm pulled down again to form a similar operation as before.

Clay articles or vessels of various sizes may be cut off and finished in precisely the same way.

It has previously been proposed to construct a machine for cutting off and shaping the upper edges of clay vessels for making pottery, such machine comprising an intermittently rotating chuck having a disc raised and lowered therein and a mechanically-operated hinged arm carrying a shaping tool.

What I claim as my invention and desire to secure by Letters Patent is:—

1. In a pottery machine, a chuck for holding the article provided with a vertical driving shaft, a lever pivoted to rock in a horizontal plane and provided with a knife for cutting off the upper part of the article when revolving with the chuck, an arm pivoted to work in a vertical plane and provided with a projection which operates the said lever when the arm is lowered, and a rounding tool carried by the said arm and engaging with the rim of the article after its upper part has been cut off by the knife.

2. In a pottery machine, the combination, with the devices set forth in claim 1, of means for automatically retracting the said lever when the said projection is raised out of engagement with it.

3. In a pottery machine, the combination, with the devices set forth in claim 1, of means for adjusting the position of the said rounding tool on the said arm to enable it to engage with the rim of the article at a predetermined time after its upper part has been cut off.

4. In a pottery machine, a chuck for holding the article, means for rotating the chuck intermittently, means for raising and lowering the article in the chuck, a pivoted arm working in a vertical plane and provided with a rounding tool for engaging the rim of the article, and a pivoted lever working in a horizontal plane and provided with a knife for cutting off the upper part of the article, said lever being operated during the down stroke of the said arm to form a suitable rim for the rounding tool to engage with.

5. A machine for cutting off and rounding the upper edge of clay vessels or bodies for use in the manufacture of teacups, breakfast cups, breakers and other vessels or articles of pottery, consisting of an intermittently rotatable chuck to accommodate the clay body and having a disc raised and lowered therein, a mechanically-operated hinged weighted arm provided with a projection to move a spring-controlled knife and a rounding tool carried on the hinged weighted arm substantially as and for the purpose described.

In testimony whereof I have hereunto set my hand in the presence of two witnesses.

ELIJAH BROOKES.

Witnesses:
J. BENTON,
J. H. COPESTARKE.